United States Patent
Vugdelija et al.

(10) Patent No.: US 9,355,315 B2
(45) Date of Patent: May 31, 2016

(54) PUPIL DETECTION

(71) Applicant: MICROSOFT TECHNOLOGY LICENSING, LLC, Redmond, WA (US)

(72) Inventors: Milan Vugdelija, Belgrade (RS); Djordje Nijemcevic, Belgrade (RS); David Zachris Nister, Bellevue, WA (US); Christopher Maurice Mei, Seattle, WA (US); Chandra Sekhar Gatla, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/340,279

(22) Filed: Jul. 24, 2014

(65) Prior Publication Data
US 2016/0026847 A1    Jan. 28, 2016

(51) Int. Cl.
*G06K 9/00* (2006.01)
*G06T 7/00* (2006.01)
*G06T 7/40* (2006.01)
*G06K 9/62* (2006.01)

(52) U.S. Cl.
CPC ............ *G06K 9/0061* (2013.01); *G06K 9/6218* (2013.01); *G06T 7/0042* (2013.01); *G06T 7/408* (2013.01); *G06T 2207/10024* (2013.01); *G06T 2207/30201* (2013.01)

(58) Field of Classification Search
USPC ................................................. 382/115–118
See application file for complete search history.

(56) References Cited

U.S. PATENT DOCUMENTS

| | | | | |
|---|---|---|---|---|
| 6,247,813 B1* | 6/2001 | Kim | .................... | G06K 9/00597 351/206 |
| 6,614,919 B1* | 9/2003 | Suzaki | ............... | G06K 9/00597 351/200 |
| 7,444,017 B2* | 10/2008 | Gallagher | ............ | G06K 9/0061 382/117 |
| 8,644,565 B2* | 2/2014 | Du | ...................... | G06K 9/00604 382/103 |
| 8,750,623 B2* | 6/2014 | Ruan | ...................... | G06T 7/0083 382/103 |
| 2003/0053663 A1* | 3/2003 | Chen | ................... | G06K 9/00281 382/117 |
| 2004/0190759 A1* | 9/2004 | Caldwell | ............ | G06K 9/00597 382/117 |

(Continued)

OTHER PUBLICATIONS

Ohno, et al., "FreeGaze: A Gaze Tracking System for Everyday Gaze Interaction", In Proceedings of the 2002 symposium on Eye tracking research & applications, Mar. 25, 2002, 8 pages.

(Continued)

*Primary Examiner* — Alex Liew
(74) *Attorney, Agent, or Firm* — Dan Choi; Judy Yee; Micky Minhas

(57) ABSTRACT

Embodiments that relate to determining an estimated pupil region of an eye are disclosed. In one embodiment a method includes receiving an image of an eye, with the image comprising a plurality of pixels. A rough pupil region is generated using at least a subset of the plurality of pixels. A plurality of pupil boundary point candidates are extracted from the rough pupil region, with each of the candidates weighted based on color values of at least two neighbor pixels. A parametric curve may be fitted to the weighted pupil boundary point candidates to determine the estimated pupil region of the eye of the user.

20 Claims, 10 Drawing Sheets

(56) References Cited

U.S. PATENT DOCUMENTS

| | | | | |
|---|---|---|---|---|
| 2005/0031173 | A1* | 2/2005 | Hwang | G06K 9/00597 382/118 |
| 2005/0111704 | A1* | 5/2005 | Verghis | G06K 9/00597 382/117 |
| 2005/0117173 | A1* | 6/2005 | Kugo | G06K 9/0061 358/1.1 |
| 2006/0147094 | A1* | 7/2006 | Yoo | G06K 9/00604 382/117 |
| 2008/0069410 | A1* | 3/2008 | Ko | G06K 9/0061 382/117 |
| 2008/0095411 | A1* | 4/2008 | Hwang | G06K 9/0061 382/117 |
| 2008/0137944 | A1* | 6/2008 | Marchesotti | G06K 9/0061 382/167 |
| 2008/0273763 | A1 | 11/2008 | Martin et al. | |
| 2009/0067680 | A1* | 3/2009 | Dowski, Jr. | G02B 5/284 382/115 |
| 2009/0092338 | A1* | 4/2009 | Achong | G06K 9/00604 382/300 |
| 2009/0202114 | A1* | 8/2009 | Morin | A63F 13/12 382/118 |
| 2011/0268354 | A1* | 11/2011 | Muninder | G06K 9/0061 382/164 |
| 2013/0170754 | A1 | 7/2013 | Tsukizawa et al. | |
| 2014/0161325 | A1* | 6/2014 | Bergen | G06K 9/0061 382/117 |

OTHER PUBLICATIONS

Mohammed, et al., "Accurate Pupil Features Extraction based on New Projection Function", In Proceedings of Computing and Informatics, vol. 29, Jan. 2010, 18 pages.

Swirski, et al., "Robust real-time pupil tracking in highly off-axis images", In Proceedings of the Symposium on Eye Tracking Research and Applications, Mar. 28, 2012, 4 pages.

Droege, et al., "Pupil Center Detection in Low Resolution Images", In Proceedings of the 2010 Symposium on Eye-Tracking Research & Applications, Mar. 22, 2010, 4 pages.

Li, et al., "Starburst: A hybrid algorithm for video-based eye tracking combining feature-based and model-based approaches", In Proceedings of the IEEE Computer Society Conference on Computer Vision and Pattern Recognition, Jun. 25, 2005, 8 pages.

Nister, et al., "Linear Time Maximally Stable Extremal Regions", In Proceedings of the 10th European Conference on Computer Vision: Part II, Oct. 12, 2008, 8 pages.

Ryan, W. et al., "Adapting Starburst for Elliptical Iris Segmentation", In IEEE 2nd International Conference on Biometrics: Theory, Applications and Systems, Sep. 29, 2008, 7 pages.

Chen, Y. et al., "A Robust Segmentation Approach to Iris Recognition Based on Video", In IEEE 37th Applied Imagery Pattern Recognition Workshop, Oct. 15, 2008, 8 pages.

Hu, X. et al., "Iterative Directional Ray-Based Iris Segmentation for Challenging Periocular Images", In Lecture Notes in Computer Science—Biometric Recognition, vol. 7098, Jan. 1, 2011, 9 pages.

Yeung, Y., "Mouse Cursor Control with Head and Eye Movements: A Low-cost Approach", Master's Thesis, Retrieved at http://www.asterics.eu/fileadmin/user_upload/Thesis_Yat-sing%20Yeung_final.pdf, Aug. 17, 2012, 84 pages.

Kassner, M. et al., "Pupil: An Open Source Platform for Pervasive Eye Tracking and Mobile Gaze-Based Interaction", Adjunct Proceedings of the 2014 ACM International Joint Conference on Pervasive and Ubiquitous Computing, Retrieved at http://arxiv.org/abs/1405.0006, Apr. 30, 2014, 10 pages.

ISA European Patent Office, International Search Report and Written Opinion issued in Application No. PCT/US2015/041433, Oct. 12, 2015, WIPO, 10 pages.

* cited by examiner

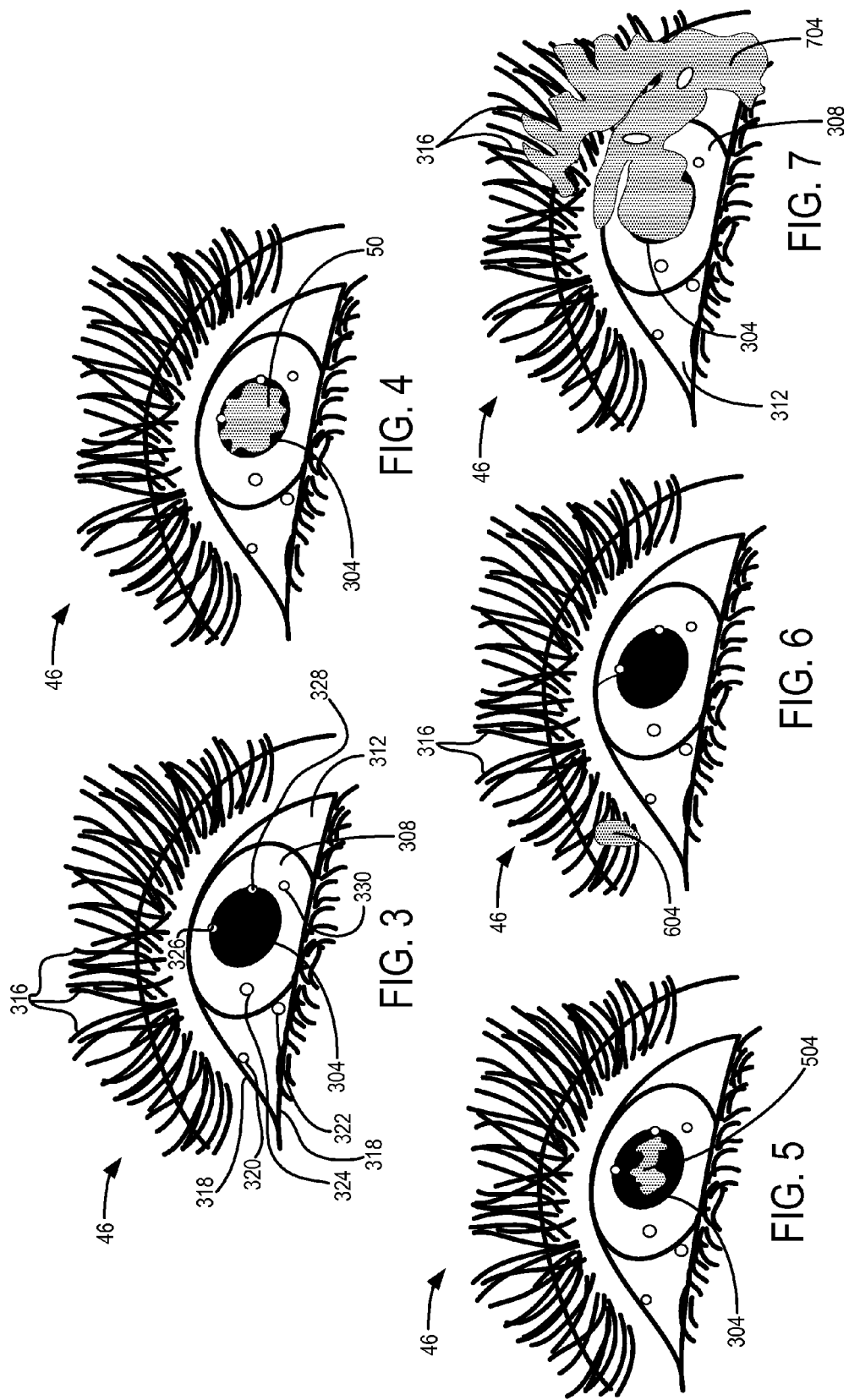

PUPIL DETECTION

Images of a person's eye may be utilized for a variety of purposes, from personal identification to human-computer interaction. For example, eye or gaze tracking systems may utilize captured images of a person's eye to determine a direction and/or location of the person's gaze. In some examples, such gaze tracking or other systems utilize the location and/or shape of the pupil of the eye.

However, one or more portions of the pupil may be obscured or occluded by an eyelid, eyelashes, glints, external reflections or other light sources, and/or other conditions. Accordingly, the accuracy of an estimated direction of a person's gaze, eye-based identity of a person, or other determination that utilizes pupil location and/or shape may suffer. Additionally, accounting for such conditions in estimating a pupil location and/or shape may prove computationally expensive.

SUMMARY

Various embodiments are disclosed herein that relate to systems and methods for determining an estimated pupil region of an eye. For example, one disclosed embodiment provides a method for determining an estimated pupil region of an eye of a user in which an image of the eye is received, with the image comprising a plurality of pixels. A rough pupil region may be generated using at least a subset of the plurality of pixels.

A plurality of pupil boundary point candidates may be extracted from the rough pupil region. Each of the candidates may be weighted based on color values of at least two neighbor pixels of the candidate to generate weighted pupil boundary point candidates. A parametric curve may be fitted to the weighted pupil boundary point candidates to determine the estimated pupil region of the eye of the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a schematic view of an image of a user's eye including several glints.

FIG. 4 is a schematic view of the image of FIG. 3 including a rough pupil region that is generated according to an example of the present disclosure.

FIGS. 5, 6 and 7 are schematic views of the image of FIG. 3 showing example maximally stable extremal regions that are identified according to examples of the present disclosure.

DETAILED DESCRIPTION

Figure 1:
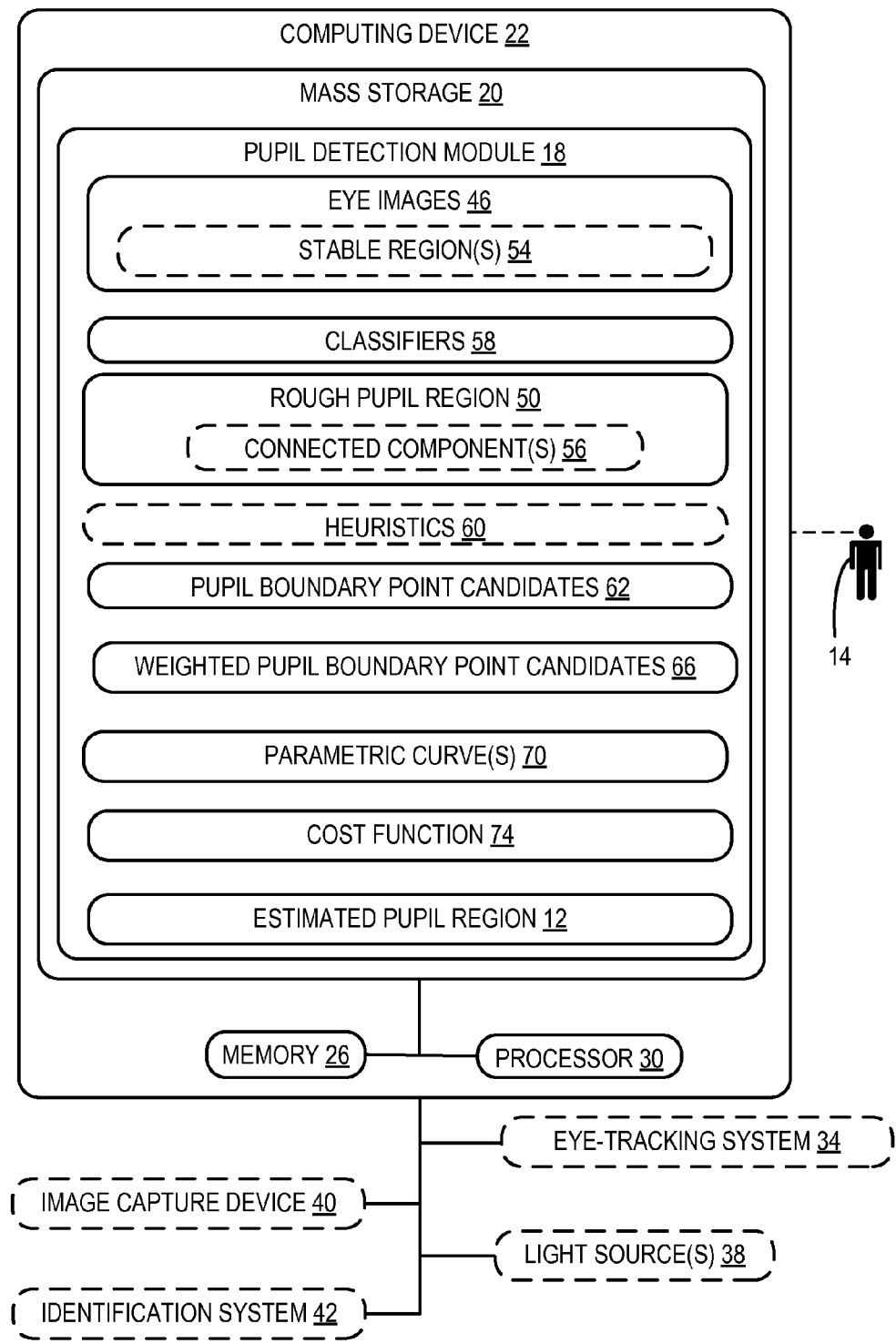
FIG. 1 is a schematic view of a system for determining an estimated pupil region of an eye according to examples of the present disclosure.

FIG. 1 shows a schematic view of one embodiment of a system 10 for determining an estimated pupil region 12 of an eye of a user 14. The system 10 includes a pupil detection module 18 that may be stored in mass storage 20 of a computing device 22. The pupil detection module 18 may be loaded into memory 26 and executed by a processor 30 of the computing device 22 to perform one or more of the methods and processes described in more detail below.

In some examples, the computing device 22 may be communicatively coupled to one or more other devices and/or components. For example, the computing device 22 may be communicatively coupled to an eye-tracking system 34 that may utilize an estimated pupil region 12 that is determined by the pupil detection module 18. In some examples, the eye-tracking system 34 may utilize one or more light source(s) 38. In some examples the light source(s) 38 may comprise infrared light sources that emit infrared light, such as an infrared LED. In other examples the light source(s) 38 may comprise visible light sources that emit visible light, such as a visible LED. The eye-tracking system 34 may further include one or more image capture devices 40 that are configured to capture images of the light that is reflected and scattered from an eye of a user.

In other examples, the computing device 22 may be communicatively coupled to an identification system 42 that may utilize an estimated pupil region 12 determined by the pupil detection module 18 to determine an identity of a user 14. It also will be appreciated that the computing device 22 may be utilized with others device(s) or component(s) that may utilize an estimated pupil region 12 that is determined and output by the pupil detection module 18.

In some examples, the computing device 22 and one or more of the eye-tracking system 34, light source(s) 38, image capture device(s) 40, and identification system 42 may be integrated into a common enclosure to form a single device.

Such devices may include, but are not limited to, desktop computers, PCs, hand-held smart phones, e-readers, laptop, notebook and tablet computers, head-mounted display (HMD) devices, peripheral displays, interactive televisions, set-top boxes, gaming consoles, etc.

Figure 2:
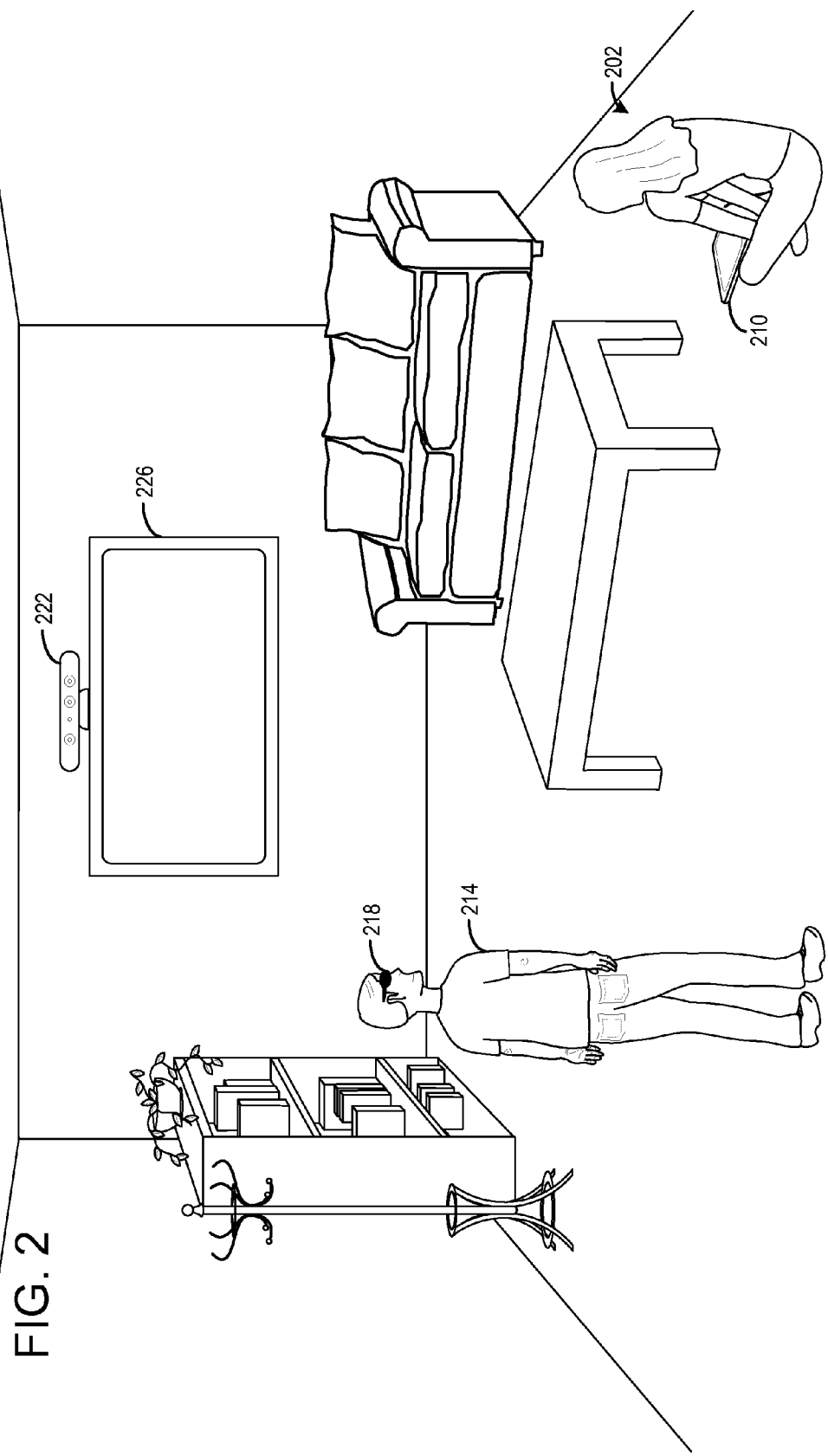
FIG. 2 is a schematic perspective view of a room including a user wearing a head-mounted display device, a user holding a tablet computer, and a wall-mounted display according to examples of the present disclosure.

For example and with reference to FIG. 2, a tablet user 202 may utilize a tablet 210 that comprises system 10. Another user 214 may wear an HMD device 218, described in more detail below, that incorporates system 10. In other examples, one or more of the eye-tracking system 34, identification system 42, light source(s) 38, and image capture device(s) 40 may be physically separate from and communicatively coupled to the computing device 22. In one example, one or more of these components may be located in an input device 222 mounted adjacent to a wall-mounted display 226, and may be communicatively coupled to a computing device 22 in the display or in a separate component, such as a gaming console, via a wired or wireless connection.

It will be appreciated that many other types and configurations of system 10 having various form factors, whether separate from or integrated with a computing device 22, may also be used and are within the scope of the present disclosure. Additional details regarding the components and computing aspects of the computing device 22 are described in more detail below with reference to FIG. 17.

With reference again to FIG. 1, in some examples the eye-tracking system 34 may be configured to utilize an estimated pupil region 12 generated by the pupil detection module 18, as described in more detail below, to determine a gaze direction of a user's eye in any suitable manner. For example, the eye-tracking system 34 may utilize images of the pupil and corneal reflections that generate corneal glints captured by the image capture device(s) 40 to determine a center of the pupil and locations of the glints. The corneal glints may be used to determine a position of the cornea. Pupil images then may be used to find an orientation of the cornea based on the glints, and a gaze vector of the eye may be determined.

In one example a bright pupil technique may be utilized in which the illuminated light from the light source(s) 38 is coaxial with the optical path of the eye, causing the light to reflect off the retina. In other examples, a dark pupil technique may be utilized in which the illuminated light is offset from the optical path.

Images of corneal glints and of the pupil as determined from image data gathered from the image capture device(s) 40 may be used to determine an optical axis of an eye. Using this information, the eye-tracking system 34 may determine a direction and/or at what physical object or virtual object the user is gazing. The eye-tracking system 34 may further determine at what point on a physical or virtual object the user is gazing. Such gaze tracking data may then be provided to the computing device 22, and may be utilized by one or more applications or other programs as needed.

In some examples and as noted above, computing device 22 may be communicatively coupled with a head-mounted display (HMD) device, such as HMD device 218 shown in FIG. 2. The HMD device 218 may comprise a transparent, semi-transparent or non-transparent display that is supported in front of a viewer's eye or eyes. In some examples, the HMD device 218 may create and display to a user 214 an augmented reality environment that includes one or more computer generated images that are displayed among one or more real-world objects in a physical environment viewed through the device. The computer generated images may comprise three-dimensional (3D) holographic images, two-dimensional (2D) images, or other forms of virtual images that are generated and displayed via HMD device 218. The HMD device 218 may thereby enable the user 214 to view such computer generated images within the physical environment surrounding the viewer.

As described in more detail below, the HMD device 218 may include various sensors and related systems that receive physical environment data from the physical environment. For example, the HMD device 218 may include a depth sensor system that includes one or more depth cameras that generate depth image data from real-world objects in the surrounding physical environment. In some examples the HMD device 218 may include an optical sensor system that utilizes at least one outward facing sensor, such as an RGB camera or other optical sensor. The outward facing sensor may capture two-dimensional image information from real-world objects in the physical environment. The HMD device 218 may also include a position sensor system comprising one or more accelerometers, gyroscopes, head tracking systems, and/or other sensors for determining a position or orientation of a user.

In some examples the HMD device 218 may include a transducer system comprising one or more actuators that convert an electrical signal into another form of energy. The transducer system may include one or more speakers for providing audio feedback to a viewer. In other examples the transducer system may include one or more tactile transducers for generating and providing haptic feedback to the viewer, such as vibrations. The HMD device 218 may also include a microphone system and one or more microphones for receiving audio input from the physical environment.

The example HMD device 218 illustrated in FIG. 2 may include the computing device 22 integrated into the HMD device. It will be appreciated that in other examples the computing device 22 may be a separate component from the HMD device 218. Many types and configurations of HMD devices having various form factors also may be used and are within the scope of the present disclosure. A more detailed description of an example HMD device is provided below with reference to FIG. 15.

With reference now also to FIGS. 3-14, descriptions of example use cases of the system 10 and pupil detection module 18 will now be provided. In one example schematically shown in FIG. 3, an image 46 of a user's eye may be received by the pupil detection module 18. The image 46 may comprise a plurality of pixels, and may show various features of the eye such as the pupil 304, iris 308, sclera 312, eyelashes 316, and eyelids 318. The image may also comprise one or more glints that are created when external light impinges upon and is reflected by the front corneal surface of the eye. Such reflections appear as intense areas (glints) in the image 46. The example of FIG. 3 shows glints 320, 322, 324, 326, 328, and 330 located at various positions in the image 46.

As noted above, in some cases one or more eyelashes 316, eyelids 318, glints, and/or other obstructions may occlude or obscure a portion of the pupil 304, potentially making reliable identification of pupil location and shape challenging. As described in more detail below, the system 10 and pupil detection module 18 of the present disclosure may reliably determine an estimated pupil region of a user's eye, even when portions of the pupil 304 in a pupil image are occluded or otherwise compromised. The system 10 and pupil detection module 18 of the present disclosure may also determine such regions using less computational resources than previous systems.

With reference now to FIG. 4, the pupil detection module 18 may be configured to use at least a subset of the pixels of the eye image 46 to generate a rough pupil region 50 that provides an initial approximation of the actual location and shape of the pupil 304 of the eye. In some examples, the pupil detection module 18 may generate potential rough pupil regions by extracting one or more stable regions 54 from the eye image 46. For example, the pupil detection module 18 may be configured to identify one or more maximally stable extremal regions (MSERs). In some examples, one or more MSERs may be identified in linear time.

An MSER may be defined as a connected component within the image region that contains pixels significantly lighter (or darker) than pixels outside of the component boundary. Local binarization is stable in an MSER over a large range of thresholds. Accordingly and in some examples, beginning with a seed pixel and a predetermined color intensity threshold, an MSER representing a potential pupil region may be determined. As the color intensity threshold is varied over a defined range, if the spatial extent of the region changes (expands/contracts) by an amount less than a stability threshold, then the connected component may be identified as an MSER.

Any of a variety of approaches for extracting MSERs from the image 46 may be utilized. In some examples, pixels considered or visited at any point during computation of an MSER may consist of a single connected component 56 of pixels in the image, resembling a flood-fill that adapts to the grey-level landscape. The computation may use a priority queue of candidate pixels (the boundary of the single connected component), a single bit image masking visited pixels, and information for as many components as there are grey-levels in the image. In this manner, a component tree of connected components of the image may be generated in true linear time. Further, by working with a single connected component of pixels, less memory is used and execution is faster as compared to other algorithms for computing MSERs.

FIGS. 5-8 show examples of different MSERs that may be identified in the eye image 46 in a manner as described above. For example, FIG. 5 illustrates an MSER 504 that is located within the pupil 304. FIG. 6 illustrates an MSER 604 that is located within eyelashes 316. FIG. 7 illustrates a larger MSER 704 that covers portions of the pupil 304, iris 308, sclera 312, eyelids 318 and eyelashes 316.

In other examples, potential rough pupil regions 50 may be identified in different manners. For example, a Haar-like detection approach may be utilized in which an input image may be convoluted with a pupil-like template image. Pixels with a high convolution response may be isolated as potential pupil centers. Simple template images may be utilized such as, for example, a black pupil-sized circle or rectangle on a white background. Connected components 56 representing potential rough pupil regions 50 may be isolated using adaptive binarization.

In other examples, the pupil detection module 18 may generate potential rough pupil regions by using one or more classifiers 58 to classify each of the pixels of the subset of pixels into one of a plurality of classification regions. The classes or regions may include, but are not limited to, pupil, iris, sclera, eyelash, background, and glint. The classifier(s) may be trained on a labeled dataset comprising images of human eyes. In some examples, the classification may be a random forest classifier. Given a large set of ground truth input, optimal questions are chosen at each node of a decision tree so that input samples are classified optimally at the end of the leaves. This trained data base may be used to predict the classification of each pixel in the input image.

The questions learned during training may be evaluated for each pixel, and depending on the response (either positive or negative), the next node of the decision tree is chosen and the next question is asked. The questions may include determining a pixel difference from one or more neighbor pixels of the subject pixel. For example, for a subject pixel an x-y color offset with respect to a neighbor pixel may be determined. The offset may be compared to a threshold and, based on the comparison, another question is evaluated for the subject pixel. Those questions that yield the largest separations between classes are selected. This process is repeated until a leaf node that predicts the classification is reached. The classifier outputs the results of the classes of the pixels, which are then grouped into one or more connected components 56 and a rough pupil region 50 is extracted.

In some examples, the MSERs and/or other connected components may be scored against a plurality of heuristics 60 that favor pupil characteristics, such as pupil size, shape, expected location, relative color, and/or other characteristics that suggest a pupil. Such heuristics 60 may include, but are not limited to, a pupil aspect ratio, a quantity of holes inside the connected component, a gradient intensity on a boundary of the connected component, a rate of change of consecutive pixel rows or pixel columns of the connected component, an average color intensity of the one or more connected components as compared to the connected component's surrounding, a distance between a centroid of the one or more connected components and a center of the eye image 46, a size of the one or more connected components relative to a size of its bounding rectangle, and a size of the one or more connected components relative to a size of the eye image 46.

Figure 10:
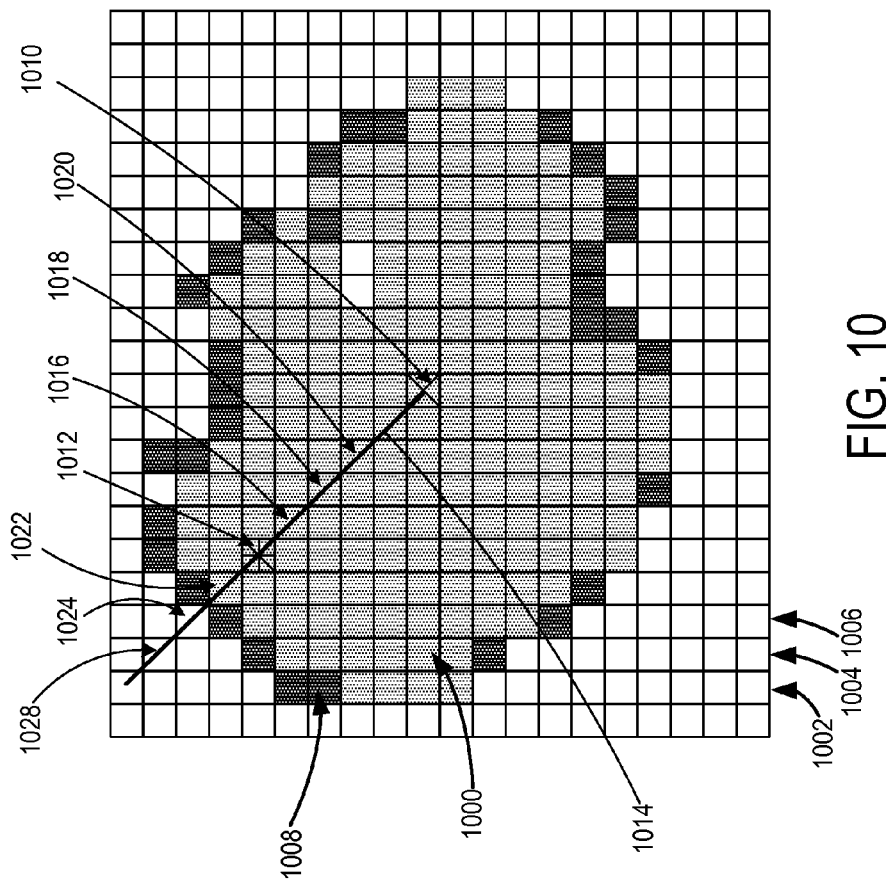
FIG. 10 is a schematic illustration of a rough pupil region and a pupil boundary point candidate located on a ray extending from an estimated center of the rough pupil region according to an example of the present disclosure.

With reference to the connected component 1000 illustrated in FIG. 10, an example of the heuristic 60 regarding the rate of change of consecutive horizontal pixel rows or consecutive vertical pixel columns of the connected component is now provided. Moving from left to right, the illustrated component 1000 has 4 pixels in its first column 1002, 6 in its second column 1004, 9 pixels in its third column 1006, and so on. Accordingly, when moving from the first column 1002 to the second column 1004, the change of consecutive vertical pixel columns is 6-4=2. When moving from second column 1004 to the third column 1006, the change of consecutive vertical pixel columns is the change is 9-6=3, and so on. The pupil detection module 18 may compute the average change between consecutive columns for the component 1000, and compare this average to a heuristic corresponding to the average change between consecutive columns of a pupil image.

Accordingly, by scoring each of the MSERs and/or other connected components against a plurality of heuristics 60 that favor pupil characteristics, the highest-scoring component may be selected as the rough pupil region 50. An example of a selected rough pupil region 50 is schematically illustrated in FIG. 4.

In the above examples of determining a rough pupil region 50, an eye image 46 that has been downscaled from a full resolution image may be utilized. In this manner, the computational resources needed to determine the rough pupil region 50 may be reduced. In one non-limiting example, for a full resolution image having a size of 640×480 pixels, the above methods may operate on a downscaled version of the image having a size of 80×60 pixels, or any other suitable lower resolution image. In other examples, the above examples may utilize the full resolution image without downscaling the image.

Figure 8:
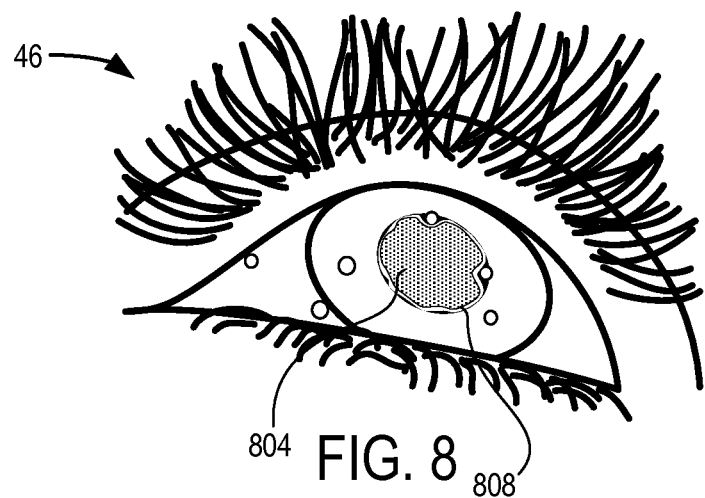
FIG. 8 is a schematic view of a connected component boundary of the rough pupil region of FIG. 4 obtained according to an example of the present disclosure.

Using the generated rough pupil region 50, the pupil detection module 18 may extract from the rough pupil region a plurality of pupil boundary point candidates 62. With reference now to FIG. 8, in some examples adaptive binarization may be performed on the rough pupil region 50 to generate a pupil connected component 804. A component boundary 808 comprising pupil boundary point candidates 62 may be extracted from the pupil connected component 804. In other examples, color information obtained from a rough pupil region 50 may be used to compute a binarization threshold that may be applied to isolate a pupil mask. Pupil boundary point candidates 62 may be extracted from such a mask.

Figure 9:
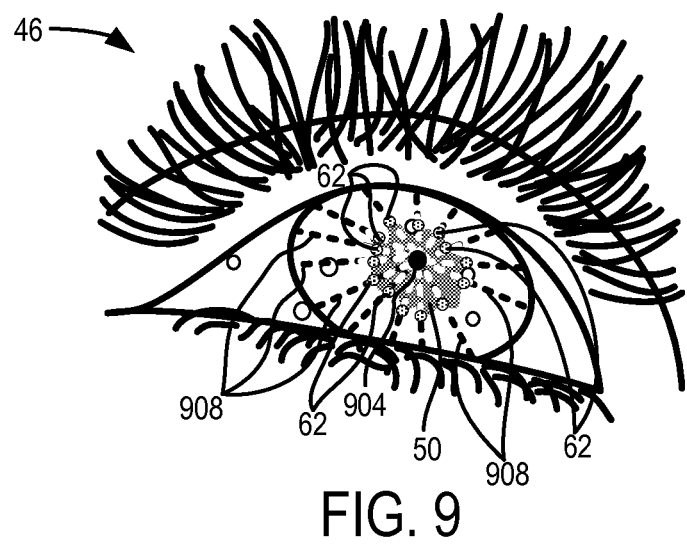
FIG. 9 is a schematic view showing pupil boundary point candidates extracted from the rough pupil region of FIG. 4 according to an example of the present disclosure.

In some examples and with reference to FIG. 9, a center 904 of the rough pupil region 50 detected above may be determined, and a number of rays 908 may be cast radially from the center. It will be appreciated that along each of these rays 908 at the boundary between the actual pupil and the iris in the image, an area of sudden color intensity change will exist. Accordingly, the pupil detection module 18 may evaluate each ray 908 and the rough pupil region 50 to identify areas of sudden color intensity change. The pupil detection module 18 may then extract a pupil boundary point candidate 62 corresponding to each such area.

Each of the extracted areas may correspond to a pupil boundary point candidate 62 that is potentially located at the pupil-iris boundary. In some cases, however, one or more pupil boundary point candidates 62 may not be located at the pupil-iris boundary, and thus may constitute false positives. Such false positives may be created by a glint or other occlusion in the eye image 46. Accordingly and as described in more detail below, the pupil detection module 18 may, for each of the pupil boundary point candidates 62, weight the pupil boundary point candidate based on color values of at least two neighbor pixels of the pupil boundary point candidate to generate weighted pupil boundary point candidates 66.

In some examples, a common property of false positive pupil boundary point candidates is that the color surrounding the candidate differs significantly from color surrounding true pupil boundary point candidates that are located at the pupil-iris boundary. For example and with reference to FIG. 13, a false positive pupil boundary point candidate 1304 located near a glint 1308 may be identified based on the high contrast of the white glint, as compared to the lower contrast of the iris region 1220 which typically will be a shade of gray that corresponds to the iris color.

Accordingly and in some examples, each of the pupil boundary point candidates 62 may be weighted based on color values of at least two neighbor pixels. With reference now to FIG. 10, a schematic illustration of a connected component 1000 comprising a rough pupil region that is shown overlying a pupil image 1008 is provided. The rough pupil region includes an estimated center pixel 1010 and a pupil boundary point candidate pixel 1012 located on a ray 1014 extending from the estimated center pixel 1010. Located along the ray 1014 and on either side of the pupil boundary point candidate pixel 1012 are neighbor pixels of the pupil boundary point candidate pixel.

In one example, the pupil detection module 18 may determine a color value of each of a plurality of inner pixels located between the pupil boundary point candidate 1012 and the estimated center pixel 1010 along the ray 1014. In some examples, the pupil detection module 18 may average the color values of two, three, four, or any suitable number of inner pixels located between the pupil boundary point candidate 1012 and the estimated center pixel 1010 along the ray 1014. With reference to the example of FIG. 10, in one example the color values of inner pixels 1016, 1018, and 1020 may be averaged to determine an average color value.

Similarly, the pupil detection module 18 may average the color values of two, three, four, or any suitable number of outer pixels located on an opposite side of the pupil boundary point candidate 1012 from the inner pixels along the ray 1014.

With reference to the example of FIG. 10, in one example the color values of outer pixels 1022, 1024, and 1028 may be averaged to determine an average color value.

Figure 11:
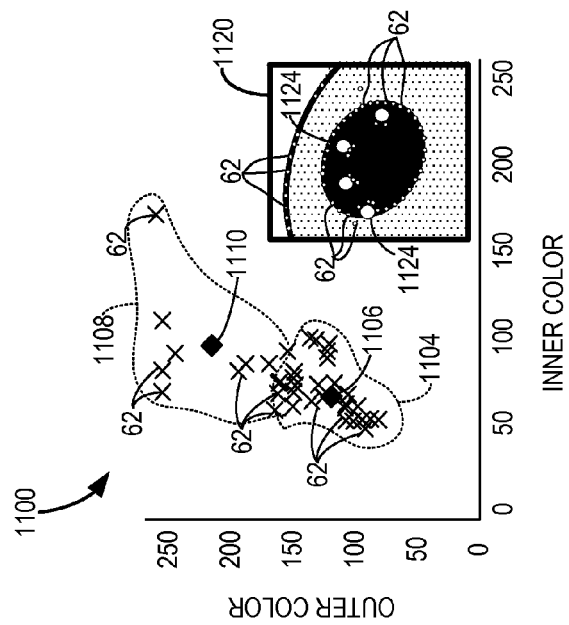
FIG. 11 is schematic diagram of a two-dimensional color space showing pupil boundary point candidates distributed via a k-means clustering algorithm according to an example of the present disclosure.

With reference now to FIG. 11, the plurality of pupil boundary point candidates 62 may be mapped to a two-dimensional color space 1100, where the x-axis represents the candidate's inner color (the color along the ray 1014 from the candidate towards the estimated center pixel 1010), while the y-axis represents the candidate's outer color (the color along the ray 1014 from the candidate away from the estimated center pixel). Most pupil boundary point candidates 62 will group in this color space around a point most likely to represent pupil color (along the inner color axis) and iris color (along the outer color axis). The pupil boundary point candidates 62 that are false positives will be spread around the color space 1100.

In some examples, a clustering algorithm may be utilized to weight pupil boundary point candidates 62 according to their distance from an estimated center of a dominant cluster. For example and as schematically illustrated in FIG. 11, a k-means clustering algorithm with k=2 may be used to assign a weight to each of the pupil boundary point candidates. Also in FIG. 11, an inset image 1120 schematically shows the location of pupil boundary point candidates 62 and glints 1124 in a portion of an image 46.

As shown in FIG. 11, applying k-means clustering with k=2 to the color values of a plurality of pupil boundary point candidates 62 yields a first cluster 1104 of points and a second cluster 1108 of points in the color space 1100. The first cluster 1104 may have a center 1106, and the second cluster 1108 may have a center 1110. In FIG. 11 the vertical "outer color" axis may represent an average color value of a plurality of outer pixels of a pupil boundary point candidate, and the horizontal "inner color" axis may represent an average color value of a plurality of inner pixels of the pupil boundary point candidate.

In the present examples, the first cluster 1104 may contain a larger number of pupil boundary point candidates 62 than second cluster 1108. Accordingly, the first cluster 1104 may be identified and utilized as the dominant cluster. For each of the pupil boundary point candidates 62, a distance from the center 1106 of the first, dominant cluster 1104 may be calculated. Using such distance, a corresponding weight for that pupil boundary point candidate 62 may be determined and assigned to the candidate. In this manner, pupil boundary point candidates 62 with an inner color and an outer color that are more similar to the dominant cluster center 1106 will be assigned higher weights. Correspondingly, pupil boundary point candidates 62 with an inner color and an outer color that are less similar to the dominant cluster center 1106 will be assigned lower weights. Accordingly, in this manner the pupil detection module 18 may weight each of the pupil boundary point candidates 62 to generate weighted pupil boundary point candidates 66.

In some examples, and in one potential advantage of the present disclosure, the pupil detection module 18 may utilize every pupil boundary point candidate 62 in determining an estimated pupil region of the eye of a user. Correspondingly, the pupil detection module 18 may avoid discarding any of the pupil boundary point candidates 62, regardless of their distance from the dominant cluster center 1106. In other examples, one or more weighted pupil boundary point candidates 66 having weights below a low weight threshold may be discarded.

Using the weighted pupil boundary point candidates 66, the pupil detection module 18 may fit a parametric curve 70 to the weighted pupil boundary point candidates to determine an estimated pupil region 12 of the eye of a user. In this manner, the pupil detection module 18 may find a boundary of the estimated pupil region 12 expressed as a parametric curve 70.

In some examples, a parametric curve may be defined by an equation $F(x, y, P)=0$, where x and y are two-dimensional image space coordinates of pupil boundary point candidates 62, and P is a set of parameters to be determined. For example, the parameters P may be determined by randomly selecting a subset of pupil boundary point candidates 62 and fitting a parametric curve 70 through those points. Repeating this approach a fixed number of iterations and scoring each curve against all of the pupil boundary point candidates may yield an approximation of a pupil boundary that defines an estimated pupil region 12.

In some examples this approach may be made iterative. For example, a Random Sample Consensus (RANSAC) algorithm may be utilized to estimate the parameters P from the set of pupil boundary point candidates 62 that contains outliers. In some examples additional pupil boundary point candidates that have small errors may also be included, and a least squares method may be utilized to obtain a more accurate model. It will be appreciated that other suitable iterative methods and algorithms also may be utilized. In some examples, the parametric curve 70 that achieves the highest score against all of the pupil boundary point candidates 62 may be used as a final result to determine the estimated pupil region 12 of the eye of the user.

In other examples, the highest-scoring parametric curve 70 may serve as a starting point of an iterative optimization algorithm such as, for example, a Levenberg-Marquardt algorithm (LMA). In this class of algorithms, the set of parameters P may be changed at each iteration in the direction of fastest decay of a cost function 74. The resulting parametric curve 70 may be used as a final result to determine the estimated pupil region 12 of the eye of the user.

In some examples, the parametric curve fitting process may comprise an optimization algorithm that determines a curve having a minimum cost function 74. The cost function 74 may be computed using each of the weighted pupil boundary point candidate 66. In some examples, elements contributing to the cost function 74 may include a distance of the weighted pupil boundary point candidate 66 from the instant curve that is being optimized. In this manner, the number of weighted pupil boundary point candidates 66 lying on or very near the instant curve will be inversely proportional to the magnitude of cost function 74 for that curve.

In some examples, elements contributing to the cost function 74 may include a weight of each of the weighted boundary point candidates 66. In this manner, weighted pupil boundary point candidates 66 with higher weights may contribute more to the value of the cost function 74. As an example, where the distance of a weighted pupil boundary point candidate 66 is far from the instant parametric curve 70, the magnitude of the cost function 74 will increase as the weight of the weighted pupil boundary point candidate 66 increases.

In some examples, elements contributing to the cost function 74 may include the magnitude of a discrepancy between an image-space gradient and a parametric curve normal for each of the weighted pupil boundary point candidates 66. As an example, as the discrepancy increases between an image-space gradient of a weighted pupil boundary point candidate and a parametric curve gradient of a parametric curve at or near the weighted pupil boundary point candidate (which gradient will be normal or approximately normal to the pupil-iris boundary line), the magnitude of the cost function 74 will likewise increase. Correspondingly, as the discrepancy between the image-space gradient and the parametric curve gradient decreases, the magnitude of the cost function 74 will likewise decrease.

Figure 12:
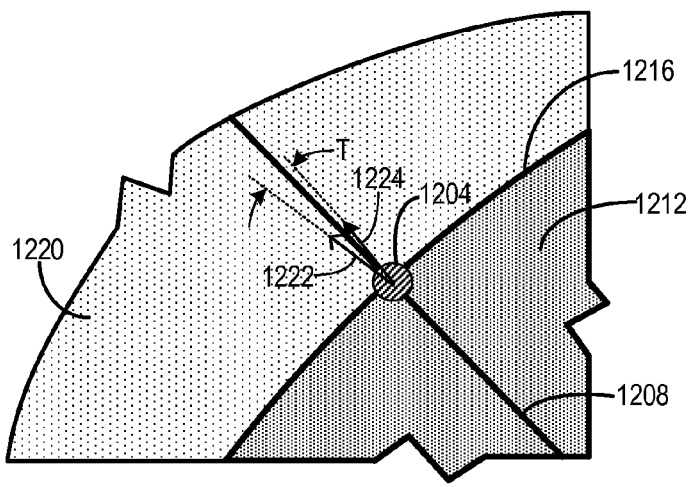
FIG. 12 is a schematic illustration of a portion of a rough pupil region and a pupil boundary point candidate located on a ray extending from an estimated center of the region
Figure 13:
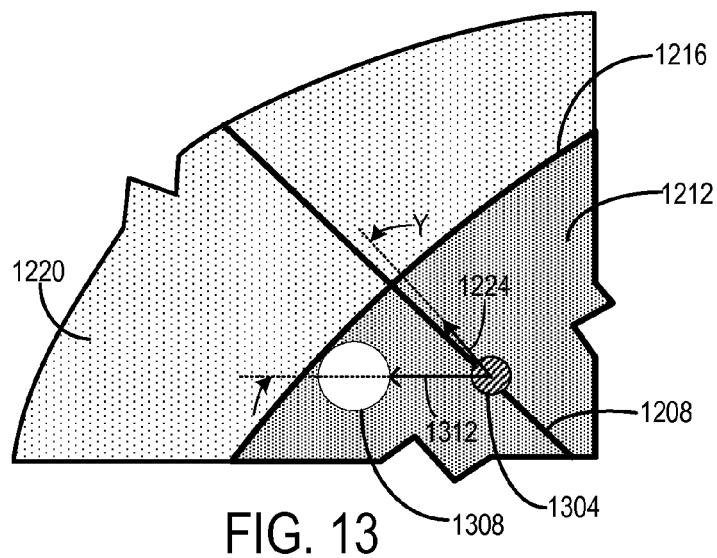
FIG. 13 is a schematic illustration of another portion of a rough pupil region and another pupil boundary point candidate located on a ray extending from an estimated center of the region.

With reference now to FIGS. 12 and 13, examples of image-space gradients for two weighted pupil boundary point candidates are provided. It will be appreciated that for a weighted pupil boundary point candidate 66 that is located at or near a parametric curve 70 that follows or closely approximates a pupil-iris boundary line, such candidate will have an image-space gradient pointing in a direction that is normal or approximately normal to the pupil-iris boundary line. Accordingly, as the color space of the eye image changes from the darker rough pupil region to the lighter iris region at the pupil-iris boundary line, such an image-space gradient will be roughly collinear with the gradient of such parametric curve at or near the weighted pupil boundary point candidate 66 (which will be normal or approximately normal to the pupil-iris boundary line).

For example and as schematically shown in FIG. 12, a weighted pupil boundary point candidate 1204 is located along ray 1208 that extends from an estimated center of rough pupil region 1212. The weighted pupil boundary point candidate 1204 is also located on a parametric curve 1216 that closely tracks a pupil-iris boundary between the rough pupil region 1212 and the iris region 1220 of the image. As shown in the example of FIG. 12, an image space gradient 1222 of the weighted pupil boundary point candidate 1204 has a direction that is offset by T degrees from the direction of a parametric curve gradient 1224 that is normal to the curve 1216. In some examples, such offset may increase the cost function by a factor of X.

Turning to the example of FIG. 13, a weighted pupil boundary point candidate 1304 is located along ray 1208 and is spaced from parametric curve 1216, thus representing a false positive. A glint 1308 is also located within the rough pupil region 1212. In this example, weighted pupil boundary point candidate 1304 was selected at least in part due to its proximity to the glint 1308. Because of the nearby and high contrast glint 1308, an image space gradient 1312 of the weighted pupil boundary point candidate 1304 has a direction pointing towards the glint. Thus, in this example the image space gradient 1312 is offset by Y degrees from the direction of the parametric curve gradient 1224, where Y is significantly greater than T. Accordingly, this larger offset increases the cost function by a factor of Z that is greater than X.

Figure 14:
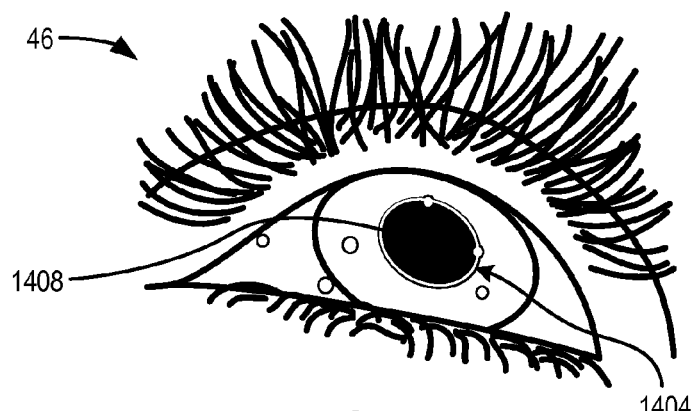
FIG. 14 is a schematic illustration of a parametric curve corresponding to an estimated pupil region that is determined according to an example of the present disclosure.

With reference now to FIG. 14 and upon fitting a parametric curve 1404 to the weighted pupil boundary point candidates 66, the pupil detection module 18 may determine an estimated pupil region 1408 of the eye of a user.

Figure 15:
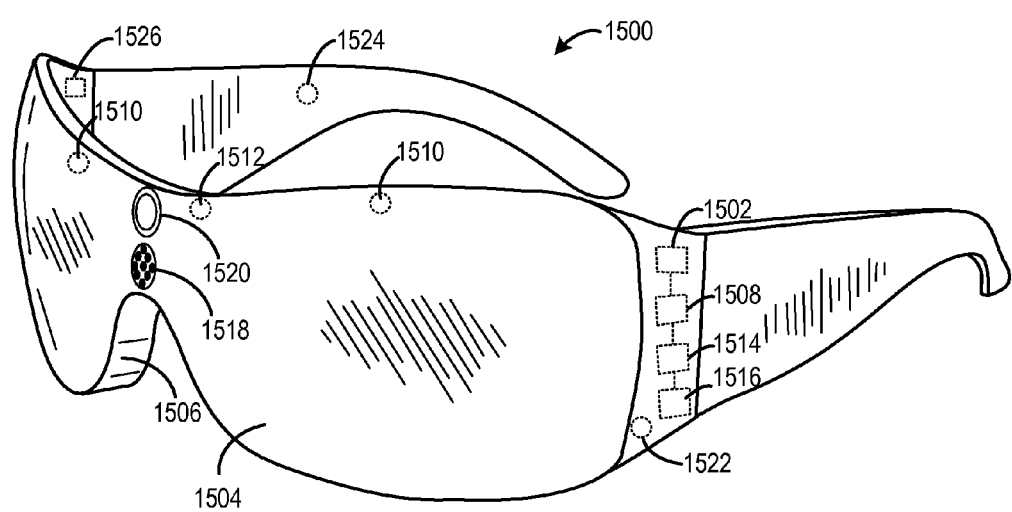
FIG. 15 schematically shows an example head-mounted display device according to an example of the present disclosure.

With reference now to FIG. 15, one example of an HMD device 1500 in the form of a pair of wearable glasses with a transparent display is provided. It will be appreciated that in other examples, the HMD device 1500 may take other suitable forms in which a transparent, semi-transparent, and/or non-transparent display is supported in front of a viewer's eye or eyes. It will also be appreciated that the HMD device 218 shown in FIG. 2 may take the form of the HMD device 1500, as described in more detail below, or any other suitable HMD device.

The HMD device 1500 includes a display system 1502 and a see-through or transparent display 1504 that enables images such as holographic objects to be delivered to the eyes of a wearer of the HMD device. The transparent display 1504 may be configured to visually augment an appearance of a real-world, physical environment to a wearer viewing the physical environment through the transparent display. For example, the appearance of the physical environment may be augmented by graphical content (e.g., one or more pixels each having a respective color and brightness) that is presented via the transparent display 1504 to create an augmented reality environment.

The transparent display 1504 may also be configured to enable a wearer of the HMD device to view a physical, real-world object in the physical environment through one or more partially transparent pixels that are displaying a virtual object representation. In some examples the transparent display 1504 may include image-producing elements located within lenses 1506 (such as, for example, a see-through Organic Light-Emitting Diode (OLED) display). As another example, the transparent display 1504 may include a light modulator on an edge of the lenses 1506. In this example, the lenses 1506 may serve as a light guide for delivering light from the light modulator to the eyes of a wearer. Such a light guide may enable a wearer to perceive a 3D holographic image located within the physical environment that the wearer is viewing, while also allowing the wearer to view physical objects in the physical environment, thus creating an augmented reality environment.

The HMD device 1500 may also include various sensors and related systems. For example, the HMD device 1500 may include an eye-tracking system 1508 that includes one or more image sensors configured to acquire image data in the form of gaze tracking data from a wearer's eyes. Provided the wearer has consented to the acquisition and use of this information, the eye-tracking system 1508 may use this information to track a position and/or movement of the wearer's eyes.

In one example, the eye-tracking system 1508 includes a gaze detection subsystem configured to detect a direction of gaze of each eye of a wearer. The gaze detection subsystem may be configured to determine gaze directions of each of a wearer's eyes in any suitable manner. For example, the gaze detection subsystem may comprise one or more light sources, such as infrared light sources 1510, configured to cause a glint of light to reflect from the cornea of each eye of a wearer. One or more image sensors, such as inward facing sensor 1512, then may be configured to capture an image of the wearer's eyes.

Images of the glints and of the pupils as determined from image data gathered from the image sensors may be used to determine an optical axis of each eye. Using this information, the eye-tracking system 1508 may then determine a direction the wearer is gazing. The eye-tracking system 1508 may additionally or alternatively determine at what physical or virtual object the wearer is gazing. Such gaze tracking data may then be provided to the HMD device 1500. It will also be understood that the eye-tracking system 1508 may have any suitable number and arrangement of light sources and image sensors.

The HMD device 1500 may also include sensor systems that receive physical environment data from the physical environment. For example, the HMD device 1500 may also include a head tracking system 1514 that utilizes one or more pose sensors, such as pose sensors 1516 on HMD device 1500, to capture head pose data and thereby enable position tracking, direction/location and orientation sensing, and/or motion detection of the wearer's head. Accordingly and as noted above, the head tracking system 1514 may receive sensor data from pose sensors 1516 that enable the orientation of the HMD device 1500 to be estimated in three degrees of freedom or the location and orientation of the HMD device to be estimated in six degrees of freedom.

In one example, head tracking system 1514 may comprise an inertial measurement unit (IMU) configured as a three-axis or three-degree of freedom position sensor system. This example position sensor system may, for example, include three gyroscopes to indicate or measure a change in orientation of the HMD device 1500 within 3D space about three orthogonal axes (e.g., x, y, and z, or roll, pitch, and yaw). The orientation derived from the sensor signals of the IMU may be used to display, via the transparent display 1504, one or more virtual objects with a body-locked position in which the position of each virtual object appears to be fixed relative to the wearer of the see-through display and the position of each virtual object appears to be moveable relative to real-world objects in the physical environment.

In another example, head tracking system 1514 may comprise an IMU configured as a six-axis or six-degree of freedom position sensor system. This example position sensor system may, for example, include three accelerometers and three gyroscopes to indicate or measure a change in location of the HMD device 1500 along the three orthogonal axes and a change in device orientation about the three orthogonal axes.

The head tracking system 1514 may also support other suitable positioning techniques, such as GPS or other global navigation systems. Further, while specific examples of position sensor systems have been described, it will be appreciated that any other suitable position sensor systems may be used. For example, head pose and/or movement data may be determined based on sensor information from any combination of sensors mounted on the wearer and/or external to the wearer including, but not limited to, any number of gyroscopes, accelerometers, inertial measurement units, GPS devices, barometers, magnetometers, cameras (e.g., visible light cameras, infrared light cameras, time-of-flight depth cameras, structured light depth cameras, etc.), communication devices (e.g., WIFI antennas/interfaces), etc.

In some examples, the HMD device 1500 may also include an optical sensor system that utilizes one or more outward facing sensors, such as optical sensor 1518 on HMD device 1500, to capture image data. The outward facing sensor(s) may detect movements within its field of view, such as gesture-based inputs or other movements performed by a wearer or by a person or physical object within the field of view. The outward facing sensor(s) may also capture 2D image information and depth information from the physical environment and physical objects within the environment. For example, the outward facing sensor(s) may include a depth camera, a visible light camera, an infrared light camera, and/or a position tracking camera.

The optical sensor system may include a depth tracking system that generates depth tracking data via one or more depth cameras. In one example, each depth camera may include left and right cameras of a stereoscopic vision system. Time-resolved images from one or more of these depth cameras may be registered to each other and/or to images from another optical sensor such as a visible spectrum camera, and may be combined to yield depth-resolved video.

In other examples, a structured light depth camera may be configured to project a structured infrared illumination, and to image the illumination reflected from a scene onto which the illumination is projected. A depth map of the scene may be constructed based on spacings between adjacent features in the various regions of an imaged scene. In still other examples, a depth camera may take the form of a time-of-flight depth camera configured to project a pulsed infrared illumination onto a scene and detect the illumination reflected from the scene. For example, illumination may be provided by an infrared light source 1520. It will be appreciated that any other suitable depth camera may be used within the scope of the present disclosure.

The outward facing sensor(s) may capture images of the physical environment in which a wearer of the HMD device is situated. With respect to the HMD device 1500, in one example an augmented reality display enhancement program may include a 3D modeling system that uses such captured images to generate a virtual environment that models the physical environment surrounding the wearer of the HMD device. In some embodiments, the optical sensor 1518 may cooperate with the IMU to determine the location and the orientation of the HMD device 1500 in six degrees of freedom. Such location and orientation information may be used to display, via the transparent display 1504, one or more virtual objects with a world-locked position in which a position of each virtual object appears to be fixed relative to real-world objects viewable through the transparent display, and the position of each virtual object appears to be moveable relative to a wearer of the see-through display.

The HMD device 1500 may also include a microphone system that includes one or more microphones, such as microphone 1522, that capture audio data. In other examples, audio may be presented to the wearer via one or more speakers, such as speaker 1524 on the HMD device 1500.

The HMD device 1500 may also include a controller, such as controller 1526. The controller 1526 may include a logic subsystem and a storage subsystem, as discussed in more detail below with respect to FIG. 17, that are in communication with the various sensors and systems of the HMD device 1500. In one example, the storage subsystem may include instructions that are executable by the logic subsystem to receive signal inputs from the sensors, determine a pose of the HMD device 1500, and adjust display properties for content displayed via the transparent display 1504.

Figure 16A:
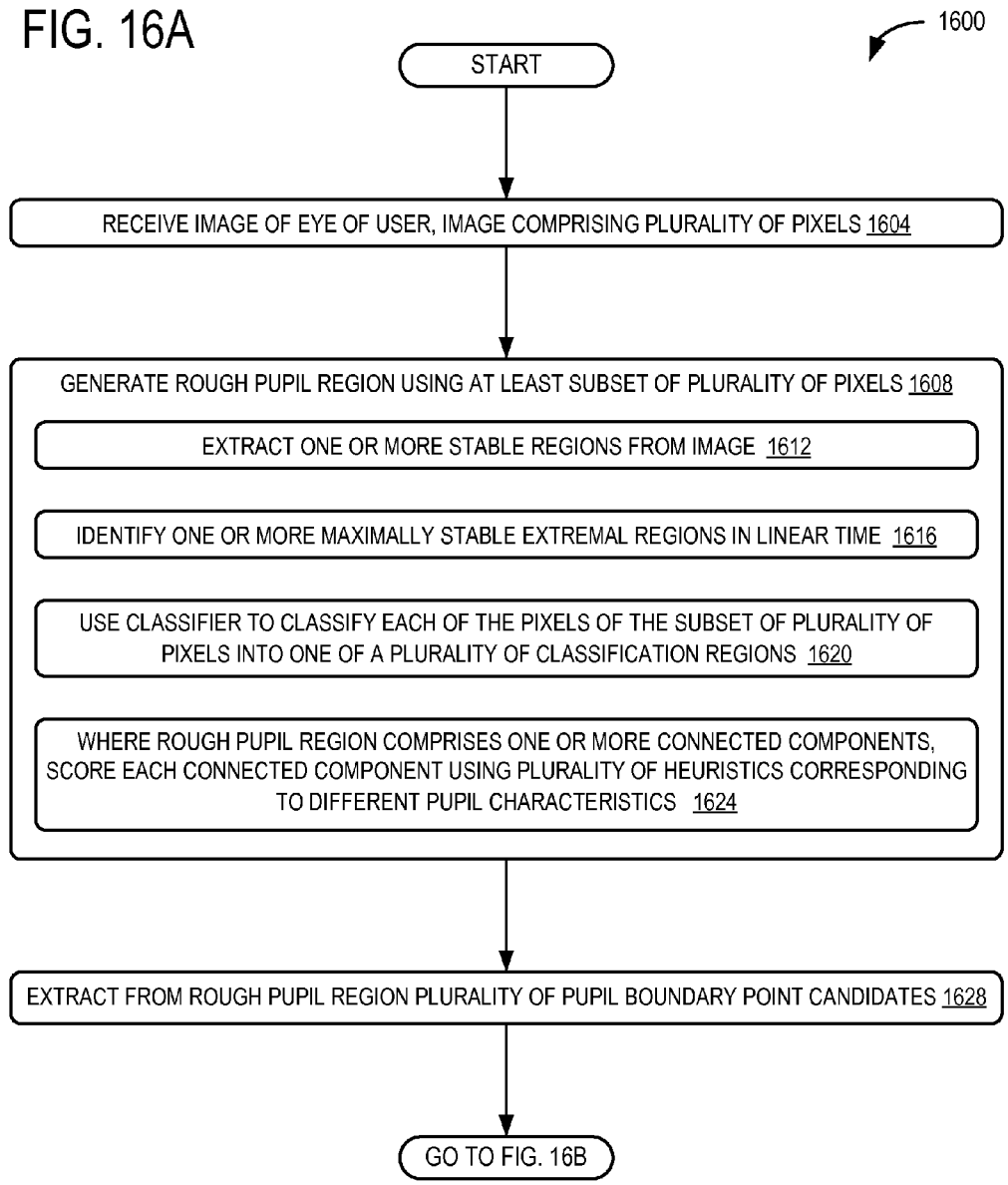
FIGS. 16A and 16B are a flow chart of a method for determining an estimated pupil region of an eye of a user according to an example of the present disclosure.
Figure 16B:
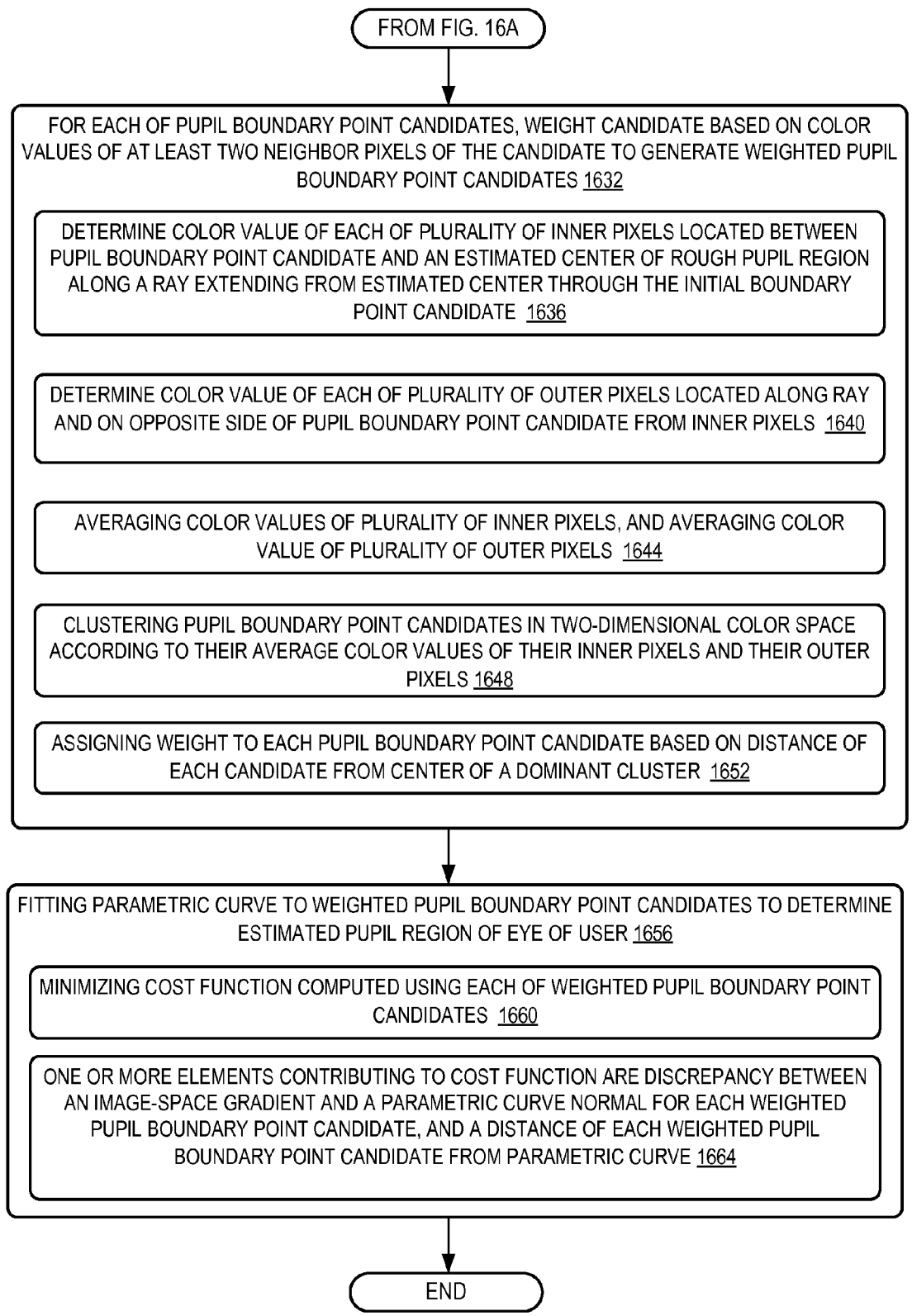

FIGS. 16A and 16B illustrate a flow chart of a method 1600 for determining an estimated pupil region of an eye of a user according to an example of the present disclosure. The following description of method 1600 is provided with reference to the software and hardware components of the system 10 described above and shown in FIGS. 1-15. It will be appreciated that method 1600 may also be performed in other contexts using other suitable hardware and software components.

With reference to FIG. 16A, at 1604 the method 1600 may include receiving an image of the eye of the user, with the image comprising a plurality of pixels. At 1608 the method 1600 may include generating a rough pupil region using at least a subset of the plurality of pixels. At 1612 the method 1600 may include extracting one or more stable regions from the image. At 1616 the method 1600 may include identifying one or more maximally stable extremal regions in linear time.

At 1620 the method 1600 may include using one or more classifiers to classify each of the pixels of the subset of the plurality of pixels into one of a plurality of classification regions. At 1624 the method 1600 may include, where the rough pupil region comprises one or more connected components, scoring each of the connected components using a plurality of heuristics corresponding to different pupil characteristics.

At 1628 the method 1600 may include extracting from the rough pupil region a plurality of pupil boundary point candidates. With reference now to FIG. 16B, at 1632 the method 1600 may include, for each of the pupil boundary point candidates, weighting the pupil boundary point candidate based on color values of at least two neighbor pixels of the pupil boundary point candidate to generate weighted pupil boundary point candidates. At 1636 the method 1600 may include determining a color value of each of a plurality of inner pixels located between the pupil boundary point candidate and an estimated center of the rough pupil region along a ray extending from the estimated center through the pupil boundary point candidate. At 1640 the method 1600 may include determining a color value of each of a plurality of outer pixels located along the ray, the plurality of outer pixels located on an opposite side of the pupil boundary point candidate from the inner pixels.

At 1644 the method 1600 may include averaging the color values of the plurality of inner pixels, and averaging the color values of the plurality of outer pixels. At 1648 the method 1600 may include clustering the pupil boundary point candidates in a two-dimensional color space according to their average color values of their inner pixels and their average color values of their outer pixels. At 1652 the method 1600 may include assigning a weight to each of the pupil boundary point candidates based on a distance of each of the pupil boundary point candidates from a center of a dominant cluster.

At 1656 the method 1600 may include fitting a parametric curve to the weighted pupil boundary point candidates to determine the estimated pupil region of the eye of the user. At 1660 the method 1600 may include minimizing a cost function that is computed using each of the weighted pupil boundary point candidates. At 1664 one or more elements contributing to the cost function may comprise one or more of a discrepancy between an image-space gradient and a parametric curve normal for each of the weighted pupil boundary point candidates, and a distance of each of the weighted pupil boundary point candidates from the parametric curve.

It will be appreciated that method 1600 is provided by way of example and is not meant to be limiting. Therefore, it is to be understood that method 1600 may include additional and/or alternative steps than those illustrated in FIGS. 16A and 16B. Further, it is to be understood that method 1600 may be performed in any suitable order. Further still, it is to be understood that one or more steps may be omitted from method 1600 without departing from the scope of this disclosure.

Figure 17:
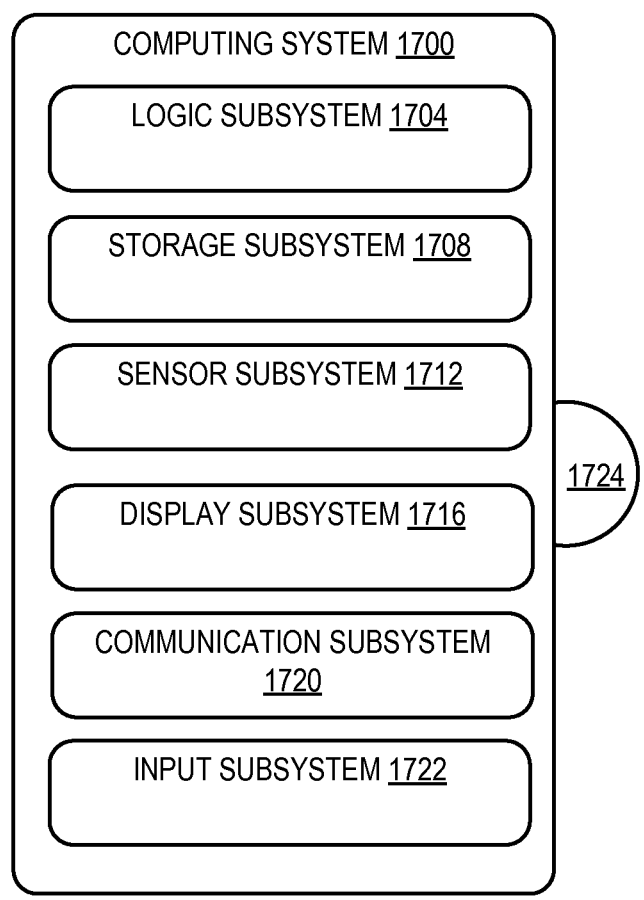
FIG. 17 is a simplified schematic illustration of an example of a computing system.

FIG. 17 schematically shows a nonlimiting embodiment of a computing system 1700 that may perform one or more of the above described methods and processes. Computing device 22 may take the form of or include one or more aspects of computing system 1700. Computing system 1700 is shown in simplified form. It is to be understood that virtually any computer architecture may be used without departing from the scope of this disclosure. In different embodiments, computing system 1700 may take the form of a mainframe computer, server computer, desktop computer, laptop computer, tablet computer, home entertainment computer, network computing device, mobile computing device, mobile communication device, gaming device, etc.

As shown in FIG. 17, computing system 1700 includes a logic subsystem 1704, storage subsystem 1708, and sensor subsystem 1712. Computing system 1700 may optionally include a display subsystem 1716, communication subsystem 1720, input subsystem 1722 and/or other subsystems and components not shown in FIG. 17. Computing system 1700 may also include computer readable media, with the computer readable media including computer readable storage media and computer readable communication media. Computing system 1700 may also optionally include other user input devices such as keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 1704 may include one or more physical devices configured to execute one or more instructions. For example, the logic subsystem 1704 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 1704 may include one or more processors that are configured to execute software instructions. Additionally or alternatively, the logic subsystem may include one or more hardware or firmware logic machines configured to execute hardware or firmware instructions. Processors of the logic subsystem may be single core or multi-core, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 1708 may include one or more physical, persistent devices configured to hold data and/or instructions executable by the logic subsystem 1704 to implement the herein described methods and processes. When such methods and processes are implemented, the state of storage subsystem 1708 may be transformed (e.g., to hold different data).

Storage subsystem 1708 may include removable media and/or built-in devices. Storage subsystem 1708 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 1708 may include devices with one or more of the following characteristics: volatile, nonvolatile, dynamic, static, read/write, read-only, random access, sequential access, location addressable, file addressable, and content addressable.

In some embodiments, aspects of logic subsystem 1704 and storage subsystem 1708 may be integrated into one or more common devices through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

FIG. 17 also shows an aspect of the storage subsystem 1708 in the form of removable computer readable storage media 1724, which may be used to store data and/or instructions executable to implement the methods and processes described herein. Removable computer-readable storage media 1724 may take the form of CDs, DVDs, HD-DVDs, Blu-Ray Discs, EEPROMs, and/or floppy disks, among others.

It is to be appreciated that storage subsystem 1708 includes one or more physical, persistent devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal via computer-readable communication media.

Sensor subsystem 1712 may include one or more sensors configured to sense different physical phenomenon (e.g., visible light, infrared light, sound, acceleration, orientation, position, etc.) as described above. Sensor subsystem 1712 may be configured to provide sensor data to logic subsystem 1704, for example such data may include image information, ambient lighting information, depth information, audio information, position information, motion information, user location information, and/or any other suitable sensor data that may be used to perform the methods and processes described above.

When included, display subsystem 1716 may be used to present a visual representation of data held by storage subsystem 1708. As the above described methods and processes change the data held by the storage subsystem 1708, and thus transform the state of the storage subsystem, the state of the display subsystem 1716 may likewise be transformed to visually represent changes in the underlying data. The display subsystem 1716 may include one or more display devices utilizing virtually any type of technology. Such display devices may be combined with logic subsystem 1704 and/or storage subsystem 1708 in a shared enclosure, or such display devices may be peripheral display devices.

When included, communication subsystem 1720 may be configured to communicatively couple computing system 1700 with one or more networks and/or one or more other computing devices. Communication subsystem 1720 may include wired and/or wireless communication devices compatible with one or more different communication protocols. As nonlimiting examples, the communication subsystem 1720 may be configured for communication via a wireless telephone network, a wireless local area network, a wired local area network, a wireless wide area network, a wired wide area network, etc. In some embodiments, the communication subsystem may allow computing system 1700 to send and/or receive messages to and/or from other devices via a network such as the Internet.

When included, input subsystem 1722 may comprise or interface with one or more sensors or user-input devices such as a game controller, gesture input detection device, voice recognizer, inertial measurement unit, keyboard, mouse, or touch screen. In some embodiments, the input subsystem 1722 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

The term "module" may be used to describe an aspect of the system 10 that is implemented to perform one or more particular functions. In some cases, such a module may be instantiated via logic subsystem 1704 executing instructions held by storage subsystem 1708. It is to be understood that different modules may be instantiated from the same application, service, code block, object, library, routine, API, function, etc. Likewise, the same module may be instantiated by different applications, services, code blocks, objects, routines, APIs, functions, etc. The term "module" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for determining an estimated pupil region of an eye of a user, the method comprising:
receiving an image of the eye of the user, the image comprising a plurality of pixels;
generating a rough pupil region using at least a subset of the plurality of pixels;
extracting from the rough pupil region a plurality of pupil boundary point candidate pixels;
for each of the pupil boundary point candidate pixels, weighting the pupil boundary point candidate pixel based on color values of at least two neighbor pixels of the pupil boundary point candidate pixel to generate weighted pupil boundary point candidates; and
fitting a parametric curve to the weighted pupil boundary point candidates to determine the estimated pupil region of the eye of the user.

2. The method of claim 1, wherein weighting each of the pupil boundary point candidate pixels based on color values of at least two neighbor pixels further comprises:
determining a color value of each of a plurality of inner pixels located between the pupil boundary point candidate pixel and an estimated center of the rough pupil region along a ray extending from the estimated center through the pupil boundary point candidate pixel; and
determining a color value of each of a plurality of outer pixels located along the ray, the plurality of outer pixels located on an opposite side of the pupil boundary point candidate pixel from the inner pixels.

3. The method of claim 2, wherein weighting each of the pupil boundary point candidate pixels based on color values of at least two neighbor pixels further comprises averaging the color values of the plurality of inner pixels, and averaging the color values of the plurality of outer pixels.

4. The method of claim 2, wherein weighting each of the pupil boundary point candidate pixels further comprises:
clustering the pupil boundary point candidate pixels in a two-dimensional color space according to an average color value of their inner pixels and an average color value of their outer pixels; and
assigning a weight to each of the pupil boundary point candidate pixels based on a distance of each of the pupil boundary point candidate pixels from a center of a dominant cluster in the two-dimensional color space.

5. The method of claim 1, wherein fitting the parametric curve to the weighted pupil boundary point candidates further comprises:
minimizing a cost function that is computed using each of the weighted pupil boundary point candidates.

6. The method of claim 5, wherein one or more elements contributing to the cost function comprise one or more of a discrepancy between an image-space gradient and a parametric curve normal for each of the weighted pupil boundary point candidates, and a distance of each of the weighted pupil boundary point candidates from the parametric curve.

7. The method of claim 1, wherein generating a rough pupil region further comprises extracting one or more stable regions from the image.

8. The method of claim 7, wherein extracting one or more stable regions from the image further comprises identifying one or more maximally stable extremal regions.

9. The method of claim 1, wherein generating a rough pupil region further comprises using one or more classifiers to classify each of the pixels of the subset of the plurality of pixels into one of a plurality of classification regions.

10. The method of claim 1, wherein the rough pupil region comprises one or more connected components, and the method further comprises scoring each of the connected components using a plurality of heuristics corresponding to different pupil characteristics.

11. A system for determining an estimated pupil region of an eye of a user, the system comprising:
a computing device; and
a pupil detection module executed by a processor of the computing device, the pupil detection module configured to:
receive an image of the eye of the user, the image comprising a plurality of pixels;
generate a rough pupil region using at least a subset of the plurality of pixels;
extract from the rough pupil region a plurality of pupil boundary point candidate pixels;
for each of the pupil boundary point candidate pixels, weight the pupil boundary point candidate pixel based on color values of at least two neighbor pixels of the pupil boundary point candidate pixel to generate weighted pupil boundary point candidates; and
fit a parametric curve to the weighted pupil boundary point candidates to determine the estimated pupil region of the eye of the user.

12. The system of claim 11, wherein to weight each of the pupil boundary point candidate pixels based on the color values of at least two neighbor pixels, the pupil detection module is further configured to:
determine a color value of each of a plurality of inner pixels located between the pupil boundary point candidate pixel and an estimated center of the rough pupil region along a ray extending from the estimated center through the pupil boundary point candidate pixel; and
determine a color value of each of a plurality of outer pixels located along the ray, the plurality of outer pixels located on an opposite side of the pupil boundary point candidate pixel from the inner pixels.

13. The system of claim 12, wherein to weight each of the pupil boundary point candidate pixels based on the color values of at least two neighbor pixels, the pupil detection module is further configured to:
average the color values of the plurality of inner pixels, and average the color values of the plurality of outer pixels.

14. The system of claim 12, wherein to weight each of the pupil boundary point candidate pixels based on the color values of at least two neighbor pixels, the pupil detection module is further configured to:
cluster the pupil boundary point candidate pixels in a two-dimensional color space according to their inner pixel values and their outer pixels values; and
assign a weight to each of the pupil boundary point candidate pixels based on a distance of each of the pupil boundary point candidate pixels from a center of a dominant cluster in the two-dimensional color space.

15. The system of claim 11, wherein to fit the parametric curve to the weighted pupil boundary point candidates, the pupil detection module is further configured to minimize a cost function that is computed using each of the weighted pupil boundary point candidates.

16. The system of claim 15, wherein one or more elements contributing to the cost function comprise one or more of a discrepancy between an image-space gradient and a parametric curve normal for each of the weighted pupil boundary point candidates, and a distance of each of the weighted pupil boundary point candidates from the parametric curve.

17. The system of claim 11, wherein to generate a rough pupil region the pupil detection module is further configured to extract one or more stable regions from the image.

18. The system of claim 17, wherein to extract one or more stable regions from the image the pupil detection module is further configured to identify one or more maximally stable extremal regions.

19. The system of claim 11, wherein to generate a rough pupil region the pupil detection module is further configured to use one or more classifiers to classify each of the pixels of the subset of the plurality of pixels into one of a plurality of classification regions.

20. A method for determining an estimated pupil region of an eye of a user, the method comprising:
- receiving an image of the eye of the user, the image comprising a plurality of pixels;
- generating a rough pupil region using at least a subset of the plurality of pixels;
- extracting from the rough pupil region a plurality of pupil boundary point candidates;
- weighting each of the pupil boundary point candidates to generate weighted pupil boundary point candidates, wherein weighting each of the pupil boundary point candidates comprises:
  - determining a color value of each of a plurality of inner pixels located between the pupil boundary point candidate and an estimated center of the rough pupil region along a ray extending from the estimated center through the pupil boundary point candidate; and
  - determining a color value of each of a plurality of outer pixels located along the ray, the plurality of outer pixels located on an opposite side of the pupil boundary point candidate from the inner pixel; and
- fitting a parametric curve to the weighted pupil boundary point candidates to determine the estimated pupil region of the eye of the user.

\* \* \* \* \*